United States Patent [19]

Blair

[11] 4,401,326
[45] Aug. 30, 1983

[54] QUICK-CONNECT TUBULAR COUPLING

[75] Inventor: Mark A. Blair, Ann Arbor, Mich.

[73] Assignee: Ford Motor Company, Dearborn, Mich.

[21] Appl. No.: 331,111

[22] Filed: Dec. 16, 1981

[51] Int. Cl.³ .................... F16L 39/00; F16L 55/00
[52] U.S. Cl. ........................... 285/318; 285/93; 285/321
[58] Field of Search ............... 285/318, 319, 321, 93

[56] References Cited

U.S. PATENT DOCUMENTS

| | | | |
|---|---|---|---|
| 2,939,728 | 6/1960 | Bitel | 285/318 X |
| 3,250,331 | 5/1966 | Boyle | 285/318 X |
| 3,453,005 | 7/1969 | Foults | 285/321 X |
| 3,532,101 | 10/1970 | Snyder | 285/318 X |
| 4,055,359 | 10/1977 | McWethy | 285/318 |

Primary Examiner—Richard J. Scanlan, Jr.
Attorney, Agent, or Firm—D. J. Harrington; F. G. McKenzie

[57] ABSTRACT

A quick-connect coupling for connecting and hydraulically sealing two tubes that carry fluid has a cage fixed to the end of one tube and a garter spring retained in the cage. The second tube, which can be fitted over the first tube, has a flared end, which, when forced into contact with the spring, causes the spring to expand until it clears the flared end after which it contracts. During the contraction process a snap ring fitted on the outer surface of the cage is dislodged abruptly and produces a positive indication that the tubes have been properly connected.

6 Claims, 4 Drawing Figures

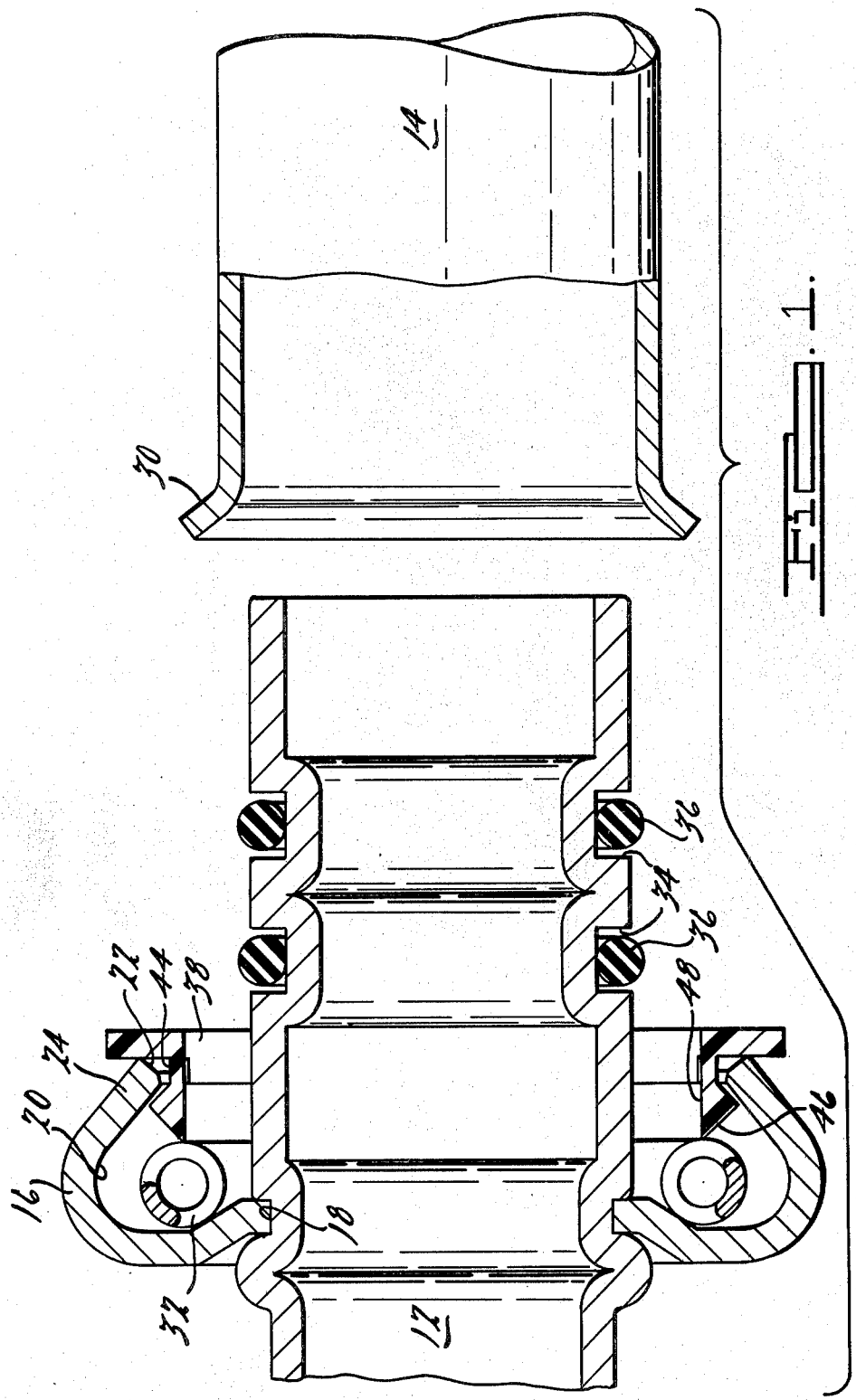

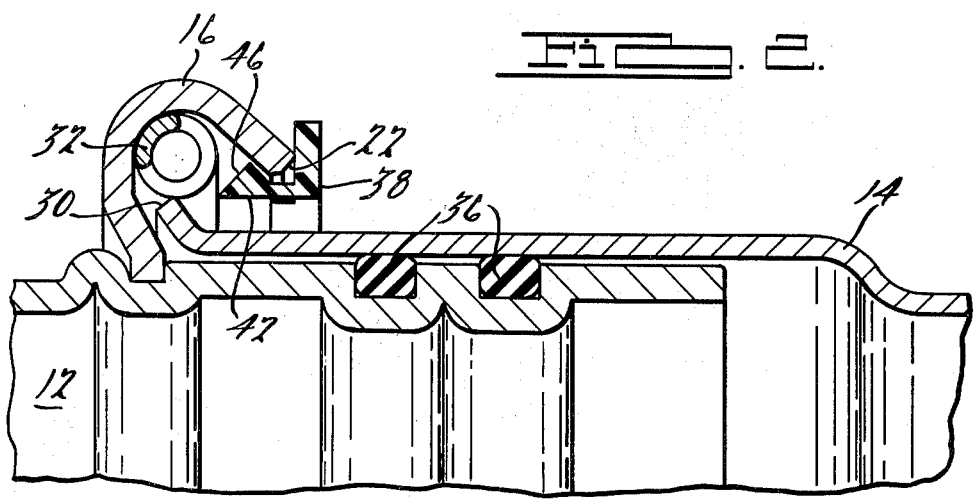
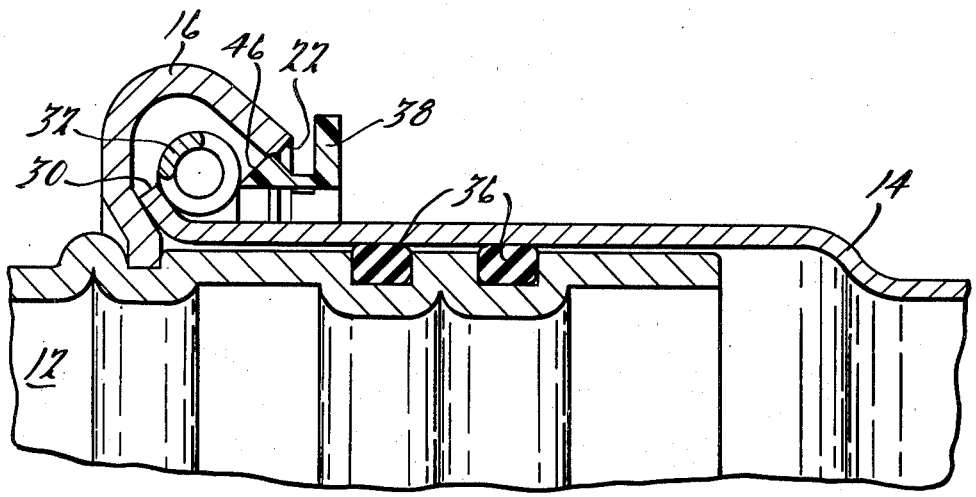
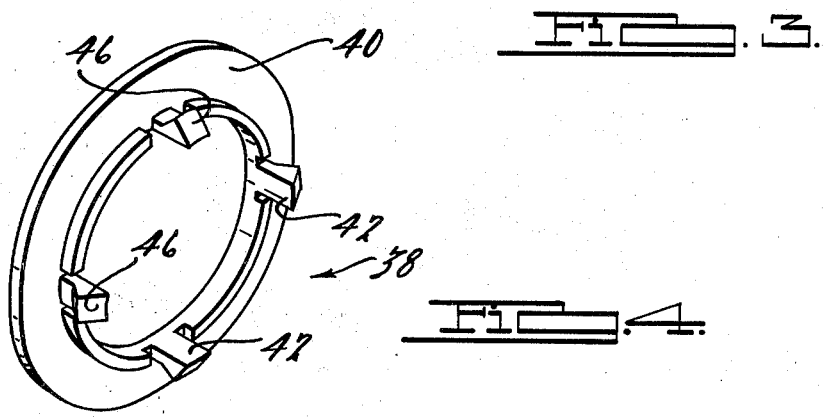

QUICK-CONNECT TUBULAR COUPLING

BACKGROUND OF THE INVENTION

1. Field of the Invention

The present invention relates to couplings for joining tubes that carry fluid and more particularly to the field of quick connect couplings of this type.

2. Description of the Prior Art

The quick connect tubular coupling described in U.S. Pat. No. 4,055,359 permits a fluid-tight connection to be made between the tubes by hand in a short time. In making this connection the operator merely applies axial force to one of the tubes and a resistance force in the opposite direction to the other tube. This action causes a garter spring to expand around the flanged end of one of the tubes and into a locking position within a cage member. It is necessary in joints of this type that carry pressurized fluid that a positive hydraulic seal be an integral part of the joint. To this end the coupling described in the patent includes at least one O-ring received in a groove formed in one tube end. The O-ring is compressed when the second tube is inserted over the first tube with an interference fit.

The difficulty with this coupling arises by reason of the frictional contact between the rubber O-rings and the metal tube end. The O-rings must be compressed in order to produce the requisite seal but this compression produces a force between the members. Consequently, a frictional force is developed on the mating surfaces whose magnitude is generally sufficient to hold the tube ends together even though the garter spring has not been expanded over the flared end of the second tube and into its locking position. Often in the assembly process it has been discovered that the coupling gives the appearance of a properly connected coupling because the frictional forces hold the tube ends in substantially the same relative positions as they would have if the connection were properly made. If the garter spring has not been forced into its locking position, the tube ends retained only by the frictional force are readily separated when the fluid circuit is pressurized under operating conditions in normal use. Loss of the fluid carried in the system requires its replacement and often return of the system to the factory because of an apparently faulty coupling.

It is preferred that some visible means clearly observable by the operator making the connection be available so that a faulty connection can be avoided. Furthermore, the visible indication that the joint has been properly assembled should continue to exist after the connection is made so that upon inspection at a later point in the manufacturing cycle there is no need for occasional disassembly of the coupling to ascertain whether the connection has been properly made.

SUMMARY OF THE INVENTION

This invention pertains to an improvement in the quick connect tubular coupling described in U.S. Pat. No. 4,055,359. The coupling, according to the present invention, is used to join first and second tubes that are members of a hydraulic system that carries fluid under pressure. The cage forming an annular chamber is mounted on the outer surface of the first tube against axial displacement near one end of the tube. The cage has an opening or aperture facing the first tube end. A radially expandable and contractable spring is located within the chamber of the cage around the outer surface of the first tube. The second tube has a radially outward flared end that can be fitted over the first tube end and forced into contact with the spring within the cage. The spring is adapted to expand radially when the tube ends are forced axially together. The spring expands over the flared end and passes from the inner surface of the flared end onto the outer flared surface. Having passed the outer periphery of the flared end the spring contracts radially around the surface and into abutting engagement with the inner surface of the cage and the outer surface of the second tube.

A brightly colored snap ring formed by nylon, elastomer or other materials having similar strength and elasticity is fitted on the periphery of the aperture of the cage before the tube ends are assembled. The snap ring has legs that extend within the cage and a recess for engaging the cage periphery. When the spring is contracting radially and moving axially along the flared outer surface of the second tube, it contacts the snap ring legs and forces them to pop out of connection with the cage. The spring displaces th space occupied by the legs when the snap ring is retained on the cage only when it has moved to the position within the cage where a positive lock is produded between the tubes. Unless the spring has moved to its proper locking position the snap ring will be retained on the cage aperture and remain a clearly visible indication that the coupling has not been properly connected.

BRIEF DESCRIPTION OF THE DRAWING

FIG. 1 is a cross section through the longitudinal axis of the components of a quick connect tubular coupling according to the present invention showing the untensioned spring at rest within the cage.

FIG. 2 is a cross section of the partially assembled tubular coupling of FIG. 1 showing the spring at the crest of the flared end of the second tube.

FIG. 3 is a cross section of an assembled tubular coupling showing the spring contracting radially on the flared surface of the tube and contacting the surface of the snap ring causing the snap ring to be forced from position on the cage aperture.

FIG. 4 is a prospective view of the snap ring employed in the tubular coupling of this invention.

DETAILED DESCRIPTION OF THE PREFERRED EMBODIMENT

Referring now to FIGS. 1-3, the coupling according to the present invention is adapted to connect a first tube 12 and a second tube 14. The coupling includes a cup-shaped cage 16 mounted on the uter surface of the first tube. Cage 16 is mounted on the outer surface of tube 12 and fixed against axial movement along the tube by retention within a recess 18 located between roll formed beads formed in the tube. The body of the cage defines a chamber 20 that has an aperature 22 at one axial end facing the end of tube 12. Adjacent aperature 22 the cage forms a radially inclined flange portion 24.

The end of the second tube 14 is slidable over the end of the first tube 12 and is provided with a radially outward extending flare or flange 30. A circular helical spring or garter spring 32 is fitted into the cage chamber 20 around the outer surface of the first tube end. The garter spring is preferably in the form of a helically coiled tension spring whose ends are joined. The spring is adapted to expand radially over the flared end of tube 14 when the coupling is assembled as shown in FIG. 3.

Spring 32 engages the outer surface of the flared end of the second tube and the inner surface of the cage thereby preventing axial removal of the tubes. Prior to assembly, spring 32 is retained within the chamber 20 because its outside diameter is larger than the diameter of aperture 22.

The end of tube 12 has axially spaced grooves 34 formed in its tubular wall, the grooves being adapted to receive conventional O-rings 36, which, in the assembled condition shown in FIG. 3, are compressed when the end of tube 14 is fitted over the end of tube 12. In the conventional way, this compressed fit seals the joint and prevents leakage of the fluid flowing in the tubes.

FIG. 4 shows a snap ring 38 made from nylon or any other material similar in strength and rigidity to nylon. Preferably the material should be brightly colored so that it will contrast markedly with the other components of the coupling. The snap ring has a circular planar surface 40 adapted to contact the outer peripheral surface of the cage aperture. Leg members 42 extend axially outward from the planar surface and into chamber 20. The legs are formed with a recess 44 that receives the peripheral surface of the cage aperture and permits the snap ring to be resiliently retained on the cage. The end of the legs are formed with a sloping surface 46 which is contacted by the garter spring 32 during the assembly procedure while the spring is contracting radially after having passed the flare 30 and moving to its locking position. The garter spring applies a force to this surface having one component in the axial direction tending to move the snap ring axially and a component in the radial direction that tends to bend the leg through its thickness and to deflect the leg so that it can clear the periphery of the cage aperture.

The connection of the tubes through the use of the tubular coupling is best understood with reference to FIGS. 1-3. Initially, the cage 16 is mounted near one end of the first tube within the recess 18 so that its aperture faces the end of tube 12. Garter spring 32 is compressed slightly to pass through aperture 22 after which it expands radially so that the outer diameter of the spring is greater than the aperture. Tube 12 has the roll formed recesses 34 on its outer surface and the O-rings 36 inserted therewithin. The legs of the snap ring are forced through the aperture until the periphery of the aperture nests within recess 44 of the snap ring. The second tube end 14 has the radially outward flare 30 formed. The radially inner surface 48 of the snap ring is large enough to permit the flared end 30 to pass through and the inside diameter of the tube end 14 forms an interference fit with the outer surface of O-rings 36.

The coupling procedure commences by inserting the second tube over the end of the first tube passing the flared end 30 through the aperture 22 and inner surface 48 of the snap ring, into the cage chamber 20 and into contact with the garter spring 32. The flanged end of the second tube is forced against the spring and causes it to expand radially outward over the flanged end. The spring then rolls over the periphery of the flanged end, contracts radially inward and becomes located between the outer surface of the flare 30 and the inner surface of the cage thereby locking the tubes and preventing their disconnection.

After the garter spring has cleared the periphery of the flare and while radially contracting, the spring contacts the sloping surfaces 46 formed on the legs of the snap ring. The contraction of the ring develops a force on the surface that has a component tending to bend this snap ring so that the legs move radially inward and a second component tending to move the snap ring axially out of the cage. This force has the effect of disconnecting the snap ring from the cage and abruptly causing the snap ring to pop out of the cage and onto the end 14 of the second tube. This condition is seen in FIG. 3 at the instant immediately before the snap ring is released.

It can be seen with reference to these figures that it is impossible for the snap ring to be driven from the cage unless the garter spring has moved to its locking position. For example, as shown in FIG. 2, if the garter spring moves only to the apex of the flare, the snap ring will remain in place. Further force applied to the tubes in the axial direction will cause the garter spring to be unseated from the flare apex and to move to its locking position. Disassembly of the coupling can be accomplished with the aid of the tool and the procedure described in U.S. Pat. No. 4,055,359, the entire disclosure of which is incorporated herein by reference.

Having described the preferred embodiment of my invention what I claim and desire to secure by U.S. Letters Patent is:

1. A coupling for joining a first tube and a second tube having a radially outward flared end adapted to fit over the end of the first tube comprising:

a cage forming a chamber mounted against axial displacement on the outer surface of the first tube near one end thereof having an aperture facing the first tube end;

a snap ring adapted for resilient retention on the periphery of the cage aperture having a surface located within the cage before the tubes are joined; and a radially expandable spring means located within the chamber of the cage around the outer surface of the first tube end, adapted to expand radially over the flared end and to become located between the outer surface of the flared end of the second tube and the inner surface of the cage thereby preventing axial withdrawl of the second tube from the first tube and to contact the snap ring surface thereby forcing the snap ring out of retention on the cage aperture upon moving past the flared end.

2. A coupling for joining first and second tubes comprising:

a cage forming an annular chamber mounted against axial displacement on the outer surface of the first tube near one end thereof having an aperture facing the first tube end;

a second tube having a radially outward flared end adapted to fit over the end of the first tube extending through the aperture into the cage chamber;

a snap ring adapted for resilient retention on the periphery of the cage aperture provided the tubes are uncoupled having a surface located within the cage; and a radially expandable spring means located within the cage chamber between the outer flared surface of the end of the second tube and the inner surface of the cage thereby coupling the tubes by preventing axial withdrawl of the second tube from the first tube adapted to contact the snap ring surface thereby causing the snap ring to disengage the cage aperture.

3. The coupling of claim 1 or 2 wherein the snap ring has a portion extending within the cage chamber before the tubes are joined, the extending portion being displaced by the spring means upon joining the tubes.

4. The coupling of claim 1 or 2 wherein the snap ring includes an abuting surface adapted to contact the outer peripheral surface of the cage aperture and leg members depending from the abuting surface extending within the cage chamber, the legs having a recess for receiving the periphery of the cage aperture therein whereby the ring is retained resiliently on the cage.

5. The coupling of claim 4 wherein the legs of the snap ring have sloping surfaces upon which the force of the spring is applied, the slope being such that the spring force on the ring is directed axially outward and radially inward.

6. A method for coupling two tubes and providing a sensible indication that the connection is properly made comprising:

mounting a cage that forms an annular chamber against axial displacement on a first tube near one end thereof, the cage having an aperture facing the first tube end;

installing a radially expandable spring within the cage chamber around the outer surface of the first tube end;

resiliently, demountably attaching a snap ring on the periphery of the cage aperture;

inserting a second tube having a radially outward flared end over the end of the first tube, through the aperture, into the cage chamber and into contact with the spring;

forcing the flared end of the second tube against the spring whereby the spring expands radially outward over the flared end and contracts radially inward upon passing the flared end thus becoming located between the outer surface of the flared end and the inner surface of the cage, locking the tubes and preventing their disconnection; and forcing the snap ring out of contact with the periphery of the cage aperture as the spring passes the flared end and moves to its locking position.

* * * * *